Sept. 8, 1970     D. R. LEWIS     3,527,481
FLEXIBLE COUPLING HAVING EXPANSION
AND CONTRACTION LIMITING MEANS
Filed Feb. 10, 1969

United States Patent Office 3,527,481
Patented Sept. 8, 1970

3,527,481
FLEXIBLE COUPLING HAVING EXPANSION AND CONTRACTION LIMITING MEANS
Douglas R. Lewis, Summit, N.J., assignor to Ethylene Corporation, Murray Hill, N.J., a corporation of New Jersey
Filed Feb. 10, 1969, Ser. No. 797,982
Int. Cl. F16l *13/04, 27/10*
U.S. Cl. 285—114　　　　　　　　　　　　　　　2 Claims

ABSTRACT OF THE DISCLOSURE

A flexible coupling for interconnecting abutting sections of flanged rigid pipe. First means is provided in the form of flexible cable for preventing excessive axial expansion of said coupling. Second means is provided in the form of annular rings preventing excessive axial contraction of said coupling and also preventing excessive radial expansion of the flexible element. Neither means prevents relative angular or parallel adjustment of the rigid components of said coupling.

---

This invention relates generally to the field of flexible couplings or expansion joints, for interconnecting relatively rigid flanged pipe sections. Devices of this general type are known in the art, and the invention lies in specific constructional details permitting improved burst strength, as well as facilitating adjustment after installation.

Devices of this general type are characterized in the provision of two rigid flange elements interconnected by a flexible bellows of length and number of convolutions sufficient to accomplish the purpose for which it is installed, the flange elements being interconnected to the flanges of abutting pipe sections, relative movement being possible therebetween by virtue of the flexibility and extensibility of the bellows. Means in the form of a plurality of bolts and corresponding nuts interconnecting the flange elements limits axial expansion, but, owing to the fact that the bolts are relatively inflexible, angular or parallel adjustment between the flange elements has been severely limited.

It is therefore among the principal objects of the present invention to provide an improved flexible coupling or joint construction, in which the above mentioned disadvantage has been substantially eliminated.

Another object of the invention lies in the provision of an improved flexible coupling in which the motion-limiting means interconnecting the flange elements thereof is of a non-extensible relatively flexible type, thereby permitting full angular and parallel adjustment between the flanges, while limiting their maximum relative separation to a degree necessary to prevent damage to the bellows.

Another object of the invention lies in the provision in a device of the class described of improved means for reducing radial expansion of the bellows element thereof, and simultaneously preventing excessive axial contraction of the bellows element to avoid damage thereto.

A further object of the invention lies in the provision of an improved flexible coupling of the type described in which the cost of fabrication may be of a reasonably low order, with consequent wide sale, distribution and use.

A feature of the disclosed embodiment lies in the fact that by virtue of the provision of flexible limiting means, the transmission of vibration from one abutting pipe section to another is minimized by damping.

Another feature of the disclosed embodiment lies in the fact that the flexible bellows element thereof may be conveniently formed from higher molecular weight resins, such as polytetrafluoroethylene (TFE) which permits wall thicknesses of adequate dimensions, and the elimination of the need of additive lubricants during the forming of the same.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figures 1, 2, 3:
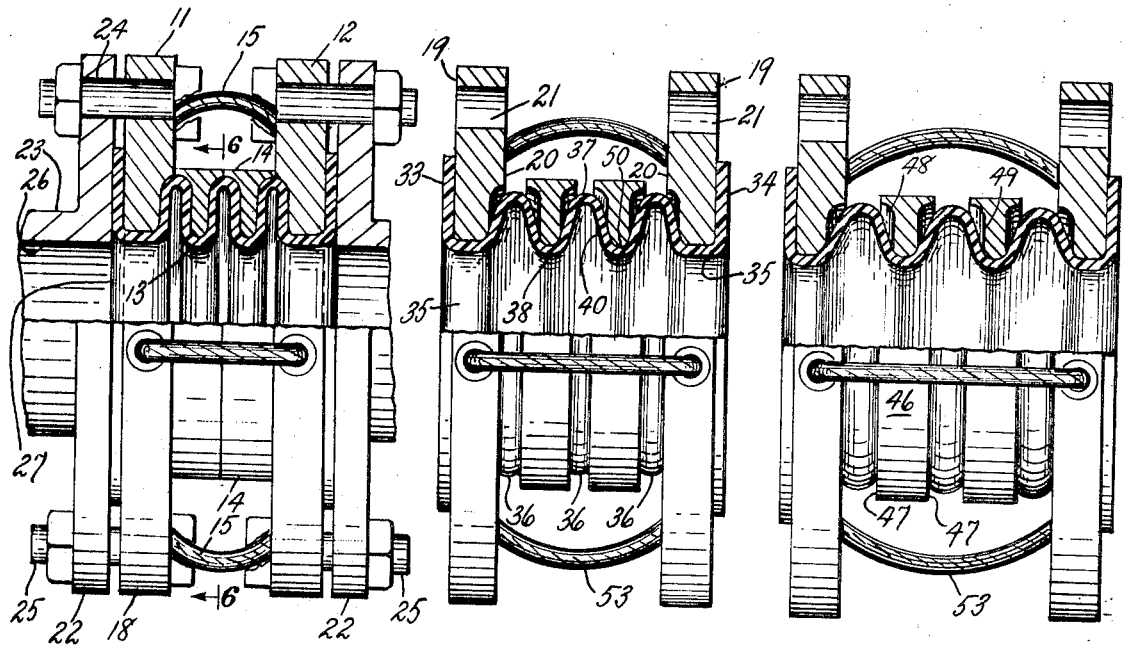
FIG. 1 is a fragmentary view in elevation, partly in section, of an embodiment of the invention, showing the same in fully contracted condition.
FIG. 2 is a similar elevational view, showing the same in axially neutral condition.
FIG. 3 is a similar elevational view showing the embodiment in axially expanded condition.

In accordance with the invention, the device, generally indicated by reference character 10, comprises broadly: first and second flange elements 11 and 12, respectively, a bellows or joint element 13, a plurality of radial expansion limiting elements 14, and a plurality of longitudinal expansion limiting means 15.

The first and second flange elements 11 and 12 are generally similar, each being bounded by a radially peripheral surface 18, an outer surface 19, and an inner surface 20. A plurality of radially positioned bores 21 adjacent to the periphery permit interconnection with corresponding flange portions 22 of individual pipe sections 23 having corresponding bores 24, the bores 20 and 24 being alignable and penetrable by bolts 25 in well known manner. A centrally disposed bore 26 leads to an arcuate recess 27. A plurality of radially extending slots 28 communicate longitudinally with radially oriented bores 29 to provide means for anchoring the means 15, as will more fully appear hereinbelow. The bores 29 accommodate force-fitted retaining members 30 of axial length less than that of the bores.

The bellows or joint element 13 is preferably moulded or otherwise formed from a suitable synthetic resinous material which will be inherently impervious to the fluids to be conducted. A very suitable material is polytetrafluoroethylene (TFE) and sold under such trademarks as "Teflon," "Halon," "Fluon," and others. It includes first and second outer flanges 33 and 34, respectively, each supported by an axially aligned cylindrical portion 35 communicating with a plurality of radially extending parallel convolutions 36. The convolutions are preferably of uniform size, each including an outer curved edge 37 and an inner curved edge 38, interconnected by generally planar walls which are preferably of uniform thickness as measured between inner and outer surfaces 40 and 41, respectively.

Figure 7:
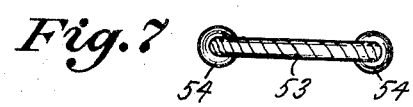
FIG. 7 is a view in elevation showing one of the means for limiting axial expansion of the device.

From a consideration of FIGS. 1, 2 and 3, it may be observed that the bellows or joint element is longitudinally expandable from a minimum interstitial distance shown in FIG. 7 to a near maximum distance shown in FIG. 3. This adjustment is accommodated by the opening of the edges 37 and 38 to a wider angle, and as this movement does not result in thinning of the wall section, mechanical strength is not affected.

The radial expansion limiting elements 14 are in the form of rings positioned to engage the outer surface of the inner edges 38 of each convolution, and are generally T-shaped in cross section. Each ring is bounded by an outer cylindrical peripheral surface 46, outer flange side surfaces 47, concave inner peripheral surfaces 48 and planar surfaces 49 converging to an inner peripheral rounded surface 50.

Figures 4, 5:
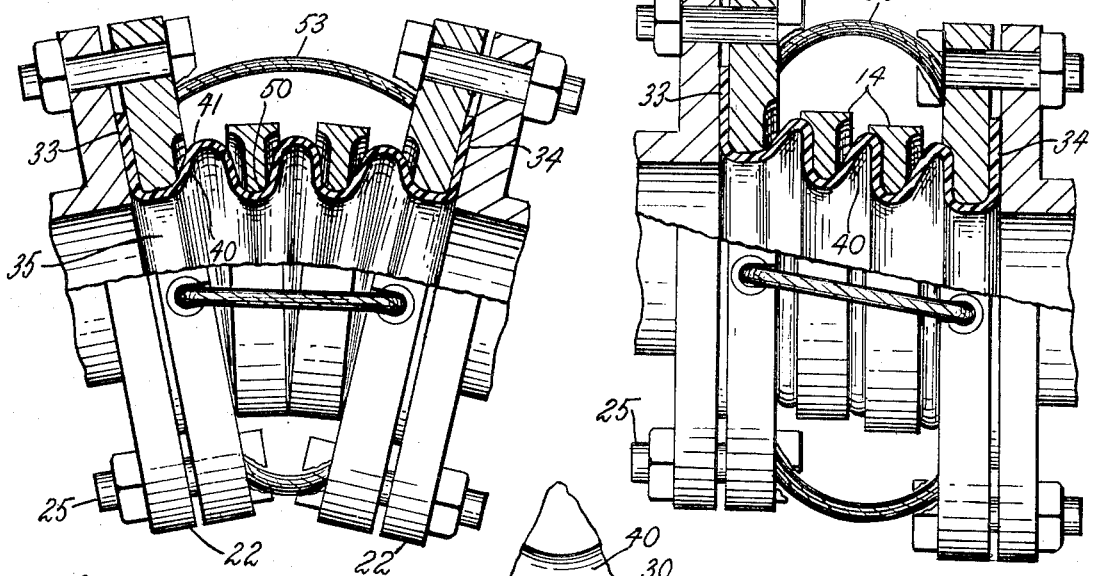
FIG. 4 is a similar fragmentary elevational view, partly in section, showing a substantial degree of angular adjustment, of which the device is capable.
FIG. 5 is a similar view disclosing a substantial degree of parallel adjustment.

The function of these rings will be best understood from a consideration of FIGS. 1, 4 and 5 in the drawing. When the flange elements 11 and 12 are at minimal interstitial distance, the side surfaces 47 are brought into abutted mutual relation, and the outer most of these surfaces contacts the inner surfaces 20 of the flange elements. In this position, the bellows or joint element 13 is completely enclosed, and further axial contraction is prevented.

With axial expansion, the rounded surface 50 controls radial expansion by contact with the inner curved edges 38, which must maintain as a result of such contact a constant inner diameter.

Referring to FIG. 4, with angular adjustment, abutment of the side surfaces 47 takes place at one point along the periphery, and this prevents pinching of the corresponding inner curved edges 38 of each convolution 36. Aside from such limitation, the convolutions are free to flex exactly as is the case in pure axial expansion. As seen in FIG. 5, the presence of the means 14 does not limit parallel relative adjustment between the flange elements 11 and 12, and the partial engagement of the outer curved edges 37 of each convolution affords a degree of support to the bellows or joint element heretofore unobtainable.

Figure 6:
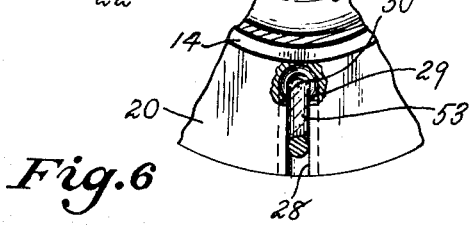
FIG. 6 is a fragmentary sectional view as seen from the plane 6—6 in FIG. 1.

Referring to FIGS. 6 and 7, the longitudinal expansion-limiting means 15, as has been mentioned, is nonextensible, but is not rigid. This means is most conveniently in the form of a plurality of flexible cables having means at either end for engagement with the flange elements 11 and 12. While it is possible to provide a plurality of bores, the axes of which are parallel to the principal axis of the flange elements, together with set screw means for interconnection purposes, I have found it preferable to provide radially extending bores 29 and cooperating slots 28 referred to hereinabove. To cooperate with the same, each of the individual metallic cables 53 is provided with welded or otherwise attached enlargements 54 at each end thereof which are slidably disposed within the bores 29, while the adjacent portion of the cable extends through the cooperating slot 28. The ends are maintained within the bores by the force-fitted retaining members 30 which can be driven into place after positioning of the enlargements.

As contrasted with the usual nut and bolt interconnecting means of prior art devices, misalignment of the bores 21 as seen in FIGS. 4 and 5, has no effect on the adjustability of the device, since the usual binding which occurs upon such adjustment does not in the instant case occur.

I wish it to be understood that I do not consider the invention limited to the precise details of structure shown and set forth in this specification, for obvious modifications will occur to those skilled in the art to which the invention pertains.

I claim:

1. In a flexible coupling for interconnecting relatively rigid flanged pipes, first and second generally planar rigid flange elements having means for positively interconnecting with flanged portions of said pipes, a flexible synthetic resinous joint element having first and second outer flange members engaging the outer, substantially planar surfaces of said first and second flange elements to form a fluid-tight seal with each of said pipes, said joint element including a plurality of axially related convolutions permitting limited expansion and contraction thereof along the principal axis of said pipes; and flexible elongated cable limiting means interconnecting said first and second flange elements for controlling the elongation of said joint element; said cable means having first and second ends thereof, each having an enlargement thereupon, said flange elements having radially extending bores defined by wall portions of said flange and communicating radially extending slots, said enlargements being larger than said slots so as to be incapable of passing therethrough engaging said wall portions defining said bores, and said cables passing through said slots adjacent thereto.

2. Structure in accordance with claim 1, including means for limiting radial expansion of said convolutions and simultaneously limiting axial contraction thereof, said last mentioned means including a plurality of annular ring elements, each having a principal axis and an axial thickness at the periphery thereof corresponding to the minimum interstitial distance between said flange elements, said ring elements having a generally T-shaped cross section including a pair of oppositely disposed concave surfaces adapted to overlie portions of the edges of adjacent convolutions when said flange elements are at minimum interstitial distance.

References Cited

UNITED STATES PATENTS

| 2,898,940 | 8/1959 | Cole | 285—114 X |
| 3,029,094 | 4/1962 | Parlasca et al. | 285—114 |
| 3,232,640 | 2/1966 | Donkle | 285—226 X |
| 3,313,319 | 4/1967 | Osborn et al. | 285—226 X |

FOREIGN PATENTS

| 1,182,077 | 1/1959 | France. |
| 999,918 | 7/1965 | Great Britain. |
| 262,058 | 3/1947 | Switzerland. |

DAVE W. AROLA, Primary Examiner

U.S. Cl. X.R.

285—226